(12) United States Patent
da Silva Júnior et al.

(10) Patent No.: US 11,699,089 B2
(45) Date of Patent: Jul. 11, 2023

(54) QUANTUM RECOMMENDATION SYSTEM

(71) Applicant: Accenture Global Solutions Limited, Dublin (IE)

(72) Inventors: Valter Eduardo da Silva Júnior, Recife (BR); Renato Moura Dantas, Recife (BR); Paulo Victor de Sousa Moura, Recife (BR)

(73) Assignee: Accenture Global Solutions Limited, Dublin (IE)

( * ) Notice: Subject to any disclaimer, the term of this patent is extended or adjusted under 35 U.S.C. 154(b) by 945 days.

(21) Appl. No.: 16/557,548

(22) Filed: Aug. 30, 2019

(65) Prior Publication Data

US 2020/0372388 A1   Nov. 26, 2020

Related U.S. Application Data

(60) Provisional application No. 62/850,874, filed on May 21, 2019.

(51) Int. Cl.
  *G06N 10/00* (2022.01)
  *G06N 20/00* (2019.01)
  *G06F 15/16* (2006.01)
  *G06F 17/18* (2006.01)
  *G06N 5/04* (2023.01)

(52) U.S. Cl.
  CPC .......... *G06N 10/00* (2019.01); *G06F 15/16* (2013.01); *G06F 17/18* (2013.01); *G06N 5/04* (2013.01); *G06N 20/00* (2019.01)

(58) Field of Classification Search
  CPC .......... G06N 10/00; G06N 20/00; G06N 5/04; G06N 5/003; G06N 7/005; G06N 7/00; G06F 15/16; G06F 17/18
  See application file for complete search history.

(56) References Cited

U.S. PATENT DOCUMENTS

| 10,922,457 | B2 * | 2/2021 | Nam | G06F 30/39 |
| 2006/0224547 | A1 * | 10/2006 | Ulyanov | B82Y 10/00 706/62 |

(Continued)

OTHER PUBLICATIONS

Lu, "Quantum decision tree classifier", Quantum Inf. Process (2014) 13:757-770. (Year: 2014).*

(Continued)

*Primary Examiner* — Dave Misir
(74) *Attorney, Agent, or Firm* — Fish & Richardson P.C.

(57) ABSTRACT

Methods, systems, and apparatus for improving recommendation systems. In one aspect, a method includes obtaining training data including data sets, wherein each data set includes a value that corresponds to the target feature and multiple values that each correspond to a respective input feature of a set of input features; assigning an input feature from the set of input features to a root node of the quantum decision tree based on calculated information gain values for the input features; creating a path from the root node by iteratively: calculating a cumulative information gain value for unassigned input features; identifying a maximal cumulative information gain value for the unassigned input features and assigning the unassigned input feature corresponding to the maximal cumulative information gain value to a current leaf node in the path creating a new leaf node.

17 Claims, 6 Drawing Sheets

(56) References Cited

U.S. PATENT DOCUMENTS

| | | | | |
|---|---|---|---|---|
| 2014/0264288 | A1* | 9/2014 | Svore | B82Y 10/00 257/31 |
| 2015/0186791 | A1* | 7/2015 | Resets | B82Y 10/00 326/6 |
| 2018/0005126 | A1* | 1/2018 | Yamagami | G06N 5/003 |
| 2018/0232652 | A1* | 8/2018 | Curtis | G06N 10/00 |
| 2019/0095561 | A1* | 3/2019 | Pednault | G06F 17/16 |
| 2020/0202248 | A1* | 6/2020 | Mezzacapo | G06N 10/00 |
| 2020/0394249 | A1* | 12/2020 | Meunier | G06N 7/005 |

OTHER PUBLICATIONS

Shende, "On the CNOT-cost of Toffoli gates", 2008. (Year: 2008).*

Aleksandrowicz et al., "Qiskit: An Open-Source Framework for Quantum Computing (Version 0.7)" Qiskit, 2019, 4 pages.

Burke, "Hybrid Recommender Systems: Survey and Experiments" User Modeling and User-Adapted Interaction 12, pp. 331-370, 2002, 40 pages.

Deutsch, "Quantum theory, the Church-Turning principle and the universal quantum computer" Proceedings of the Royal Society of London A 400, pp. 97-117, 1985, 22 pages.

Dua et al., "UCI Machine Learning Repository" University of California, Irvine, School of Information and Computer Sciences, 2017, 2 pages.

Fawcett, "An introduction to ROC analysis" Pattern Recognition Letters, vol. 27, No. 8., pp. 861-874, 2006, 14 pages.

Feynman, "Simulating physics with computers" International Journal of Theoretical Physics, pp. 467-488, 1982, 22 pages.

Fisher, "A History of the Central Limit Theorem: From Classical to Modern Probability Theory" Sources and Studies in the History of Mathematics and Physical Sciences, 2011, 415 pages.

Grover, "A fast quantum mechanical algorithm for database search" Proceedings of the 28th Annual ACM Symposium on Theory of Computing, pp. 212-219, 1996, 8 pages.

Hastings, "Monte Carlo Sampling Methods Using Markov Chains and Their Applications" Biometrika 57 (1), 97, 1970, 14 pages.

Kohavi, "A study of cross-validation and bootstrap for accuracy estimation and model selection" International Joint Conference on Artificial Intelligence, v.14, p. 11371145, 1995, 7 pages.

McCullagh et al., "Generalized Linear Models" Chapman and Hall, London, Second Edition, 1989, 526 pages.

Mitchell, "Machine Learning" McGraw Hill, 1997, 421 pages.

Nielsen et al., "Quantum Computation and Quantum Information" Cambridge University Press, 2000, 704 pages.

O'Donovan et atl., "Trust in recommender systems" Proceedings of the 10th International Conference on Intelligent User Interfaces, pp. 167-174, 2005, 8 pages.

Quinlan, Induction of decision trees, p. 81106, 1986, 26 pages.

Resnick et al., "Recommender Systems" Commun. ACM 40, pp. 56-58, 1997, 3 pages.

Shardanand et al., "Social Information Filtering: Algorithms for Automating Word of Mouth" Proceedings of the SIGCHI Conference on Human Factors in Computing Systems, pp. 210-217, 1995, 8 pages.

Shende et al., "On the CNOT-cost of Tofolli gates" arxiv:0803.2316v1, 2008, 28 pages.

Winterbottom et al., "Django-Oscar: A e-commerce framework for Django designed for building domain-driven sites (Version 1.6.7)" Oscar Commerce, 2019, 227 pages.

EP Extended European Search Report in European Appln. No. 20173901.8, dated Jan. 21, 2021, 15 pages.

Lu et al., "Quantum decision tree classifier," Quantum Inf. Processing, Nov. 19, 2013, 13:757-770.

EP Partial European Search Report in European Appln. No. 20173901.8, dated Oct. 12, 2020, 13 pages.

* cited by examiner

```
┌─────────────────────────────────────────────────────────┐
│ Obtain training data including multiple data sets, each │
│ including a value that corresponds to a target feature  │
│ and multiple values that correspond to respective input │
│ features                                            202 │
└─────────────────────────────────────────────────────────┘
                           ↓
┌─────────────────────────────────────────────────────────┐
│ Calculate an information gain value for each input      │
│ feature using values that correspond to the input       │
│ feature                                             204 │
└─────────────────────────────────────────────────────────┘
                           ↓
┌─────────────────────────────────────────────────────────┐
│ Identify a maximal calculated information gain value    │
│ and assign the input feature corresponding to the       │
│ maximal information gain value to the root node     206 │
└─────────────────────────────────────────────────────────┘
                           ↓
┌─────────────────────────────────────────────────────────┐
│ Create a path from the root node                        │
│  ┌────────────────────────────────────────────────────┐ │
│  │ Calculate a cumulative information gain value for  │ │
│  │ unassigned input features based on multiple        │ │
│  │ information gain values for already assigned input │ │
│  │ features and a probability of [[to be completed]]  │ │
│  │                                                208 │ │
│  └────────────────────────────────────────────────────┘ │
│                         ↓                               │
│  ┌────────────────────────────────────────────────────┐ │
│  │ Identify a maximal cumulative information gain     │ │
│  │ value and assign the input feature corresponding   │ │
│  │ to the maximal cumulative information gain value   │ │
│  │ to current leaf node and creating a new leaf node  │ │
│  │                                                210 │ │
│  └────────────────────────────────────────────────────┘ │
└─────────────────────────────────────────────────────────┘
```

Receive input data including multiple values corresponding to respective input features
*302*

Search a list containing data items representing respective paths in the trained quantum decision tree to identify data items in the list that represent a path that matches the received input data by applying a Grover algorithm that uses generalized CNZ quantum logic gates
*304*

Determine a predicted value of the target feature using one or more likelihoods associated with paths represented by the identified data items
*306*

Where the ± gates of rotation can be described as:

$$R_z(\pm\pi/16) \propto \begin{pmatrix} 1 & \\ & \exp^{\pm i\pi/8} \end{pmatrix}$$

FIG. 5

QUANTUM RECOMMENDATION SYSTEM

CROSS-REFERENCE TO RELATED APPLICATION

This application claims the benefit of U.S. Provisional Application No. 62/850,874, filed May 21, 2019, and titled "Quantum Recommendation System," which is incorporated by reference in its entirety.

BACKGROUND

The present invention relates to quantum computing.

One example model for quantum computation is the quantum circuit model. In the quantum circuit model, a computation is a sequence of quantum gates—reversible transformations on a quantum mechanical analog of an n-bit register. This analogous structure is referred to as an n-qubit register. Example quantum gates include single qubit gates such as the Hadamard gate or Pauli gates, and multi qubit gates such as controlled Pauli gates.

SUMMARY

This specification describes methods and systems for applying quantum computing techniques in a recommendation system.

In general, one innovative aspect of the subject matter described in this specification can be implemented in a method that includes obtaining training data including data sets, wherein each data set includes a value that corresponds to the target feature and multiple values that each correspond to a respective input feature of a set of input features; assigning an input feature from the set of input features to a root node of the quantum decision tree, including: for each input feature in the set of input features: calculating an information gain value for the input feature using values that correspond to the input feature; and identifying, from the calculated information gain values, a maximal information gain value and assigning the input feature corresponding to the maximal information gain value to the root node; creating a path from the root node, wherein creating the path comprises: iteratively: calculating a cumulative information gain value for unassigned input features based on i) multiple information gain values for respective input features that have been assigned to previous nodes on the path, and ii) probabilities that the unassigned input feature is assigned to the current leaf node given the assigned input features to previous nodes on the path; and identifying, from the calculated cumulative information gain values, a maximal cumulative information gain value for the unassigned input features and assigning the unassigned input feature corresponding to the maximal cumulative information gain value to a current leaf node in the path creating a new leaf node.

Other implementations of this aspect include corresponding classical, quantum or classical-quantum computer systems, apparatus, and computer programs recorded on one or more computer storage devices, each configured to perform the actions of the methods. A system of one or more classical and quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations the method further comprises, for one or more of the calculated cumulative information gain values, performing one or more Monte Carlo simulations to generate respective modified cumulative information gain values, and wherein identifying, from the calculated cumulative information gain values, a maximal cumulative information gain value and assigning the input feature corresponding to the maximal cumulative information gain value to the path node comprises identifying, from the modified cumulative information gain values, a maximal modified cumulative information gain value and assigning the input feature corresponding to the maximal modified cumulative information gain value to the path node.

In some implementations the Monte Carlo simulation samples from a binomial distribution.

In some implementations performing the Monte Carlo simulation comprises performing the Monte Carlo simulation using a quantum computer.

In some implementations the method further comprises storing the calculated cumulative information gain values identified as maximal, together with an identification of a corresponding path node i and input feature k in one or more lists.

In some implementations calculating a cumulative information gain value for the unassigned input feature based on i) multiple information gain values for respective input features that have been assigned to previous nodes on the path, and ii) probabilities that the unassigned input feature is assigned to the current leaf node given the assigned input features to previous nodes on the path, comprises calculating $$S_{i,k} = \frac{\sum_{j=0}^{i}(1-GI_j)P_{j,k}}{\sum_{j=0}^{i}(1-GI_j)}$$

where i represents the path node for the iteration, k represents the unassigned input feature, j is an index representing previous nodes on the path, $GI_j$ represents an information gain value calculated using input feature values that correspond to the input feature assigned to node j, and $P_{j,k}$ represents a probability that the unassigned input feature k is assigned to the current leaf node given the assignment of input feature j.

In some implementations the quantum decision tree is constructed to perform a machine learning task, for example a classification task or a regression task.

Another innovative aspect of the subject matter described in this specification can be implemented in a method that includes receiving input data comprising multiple values corresponding to respective input features; searching a list containing data items representing respective paths in the trained quantum decision tree, wherein each path in the quantum decision tree is associated with one or more likelihoods that the target feature takes each of the multiple possible values, to identify one or more data items in the list that represents a path that matches the input data, wherein searching the list comprises applying a Grover algorithm on a quantum computer using a generalized CNZ quantum logic gate to search the list; and determining a predicted value of the target feature using one or more likelihoods associated with paths represented by the identified one or more data items.

Other implementations of this aspect include corresponding classical, quantum or classical-quantum computer systems, apparatus, and computer programs recorded on one or more computer storage devices, each configured to perform the actions of the methods. A system of one or more classical and quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations using the generalized CNZ quantum logic gate comprises, for a quantum register comprising two qubits: performing a controlled-X gate on a second qubit, wherein a first qubit acts as a control for the controlled-X gate; performing a phase rotation with an angle of $-\pi/16$ on the second qubit; performing a controlled-X gate on the second qubit, wherein the first qubit acts as a control for the controlled-X gate; and performing a phase rotation with an angle of $\pi/16$ on the second qubit.

In some implementations using the generalized CNZ quantum logic gate comprises, for a quantum register comprising three or more qubits, repeatedly performing, a number of times equal to twice the number of qubits i minus 1: performing a controlled-X gate on an i-th qubit, wherein an i–1-th qubit acts as a control for the controlled-X gate; performing a phase rotation with an angle of $-\pi/16$ on the i-th qubit; performing a controlled-X gate on the i-th qubit, wherein the $1^{st}$ qubit acts as a control for the controlled-X gate; and performing a phase rotation with an angle of $\pi/16$ on the i-th qubit.

In some implementations implementing a Grover algorithm on a quantum computer using a generalized CNZ quantum logic gate comprises: initializing each of multiple qubits in a quantum register in a zero state; performing an oracle step on a subset of the multiple qubits; performing a Hadamard gate on each qubit in the quantum register; performing a Pauli-X gate on each qubit in the quantum register; performing the generalized CNZ quantum logic gate; performing a Pauli-X gate on each qubit in the quantum register; and performing a Hadamard gate on each qubit in the quantum register.

In some implementations the method further comprises before performing the generalized CNZ quantum logic gate, performing a phase rotation with an angle of $\pi/16$ on a first qubit in the quantum register.

In some implementations the machine learning task comprises a multiclass classification task, and wherein determining a predicted value of the target feature using one or more likelihoods associated with paths represented by the identified one or more data items comprises selecting a predicted value of the target feature that corresponds to a largest likelihood.

In some implementations the machine learning task comprises a regression task and wherein determining a predicted value of the target feature using one or more likelihoods associated with paths represented by the identified one or more data items comprises selecting the predicted value of the target feature as equal to the likelihood.

In some implementations the input data is incomplete.

The subject matter described in this specification can be implemented in particular ways so as to realize one or more of the following advantages.

A quantum recommendation system, as described in this specification, can generate recommendations that are more accurate and effectiveness compared to recommendations generated by other recommendation systems. For example, due to the increased computation processing capabilities of the presently described quantum recommendation system, recommendations can be generated using a large number of high-quality input features—without implementing constraints and shortcuts. In addition, a quantum recommendation system, as described in this specification, can generate accurate and effective recommendations more efficiently and in real time.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Recommendation systems are information filtering systems that are used to predict a rating or preference that a user would give to an item. Based on these predictions, the recommendation system can recommend items to a user.

Recommendation systems can be applied to a variety of settings. For example, some recommendation systems are used to recommend products to a user. When recommending products to a user, different strategies can be implemented to achieve respective goals. For example, a recommendation system can recommend products that are frequently purchased with a product that a user has already selected for purchase, or can recommend products that are similar to a product that a user has recently viewed. As another example, recommendation systems are used to recommend content to a user, e.g., video content or music content.

Recommendation systems use features to predict a candidate set of items to recommend. Example features include user characteristics, e.g., user gender, age, etc., and product characteristics, e.g., type of product, product price range, etc. Generally, increasing the number of features available to the recommendation system increases the accuracy and efficacy of recommendations predicted by the recommendation system.

However, increasing the number of features available to the recommendation system also increases the computational processing requirements of the recommendation system. Even more so if a prediction is to be obtained in real-time. Since the size of a recommendation task can grow in a combinatorial way based on the number of features used, classical computers soon become inefficient at, or incapable of, solving such recommendation tasks. Conventional strategies, e.g., strategies different to those described in this specification, utilized to deal with this problem invariably include reducing the number or quality of features, implementing constraints and shortcuts to reduce the size of the task, and heuristics to produce results in an acceptable time. This results in a tradeoff between computational runtime and prediction accuracy.

This specification describes a quantum recommendation system. The quantum recommendation system uses both classical computing technology and quantum computing technology to construct a quantum decision tree for performing a machine learning task such as a classification or regression task. While traditional approaches for training decision trees use only information on a last node to make a prediction, the techniques described in this specification take not only information on a last node, but a cumulative weighted average of all the nodes in the path that the item has passed from the root node to the leaf.

In addition, the quantum decision tree grows without pruning, so the last level of the tree represents a maximum stack of combinations between the features of the training data. This growth strategy leads to a combinatorial growth when the number of features increases, getting to a maximum of $\Pi_{i=1}^{n} \delta_i$, where n represents the number of features in the training dataset and $\delta_i$ is equal to the number of possible values of each feature. Monte Carlo simulations can be used to avoid overfitting in the construction process.

At runtime, an implementation of Grover's algorithm is used to search the quantum decision tree for items to be recommended. In this manner, even systems with complex combinatorial growth are able to perform real time searches.

Example Hardware

Figure 1A:
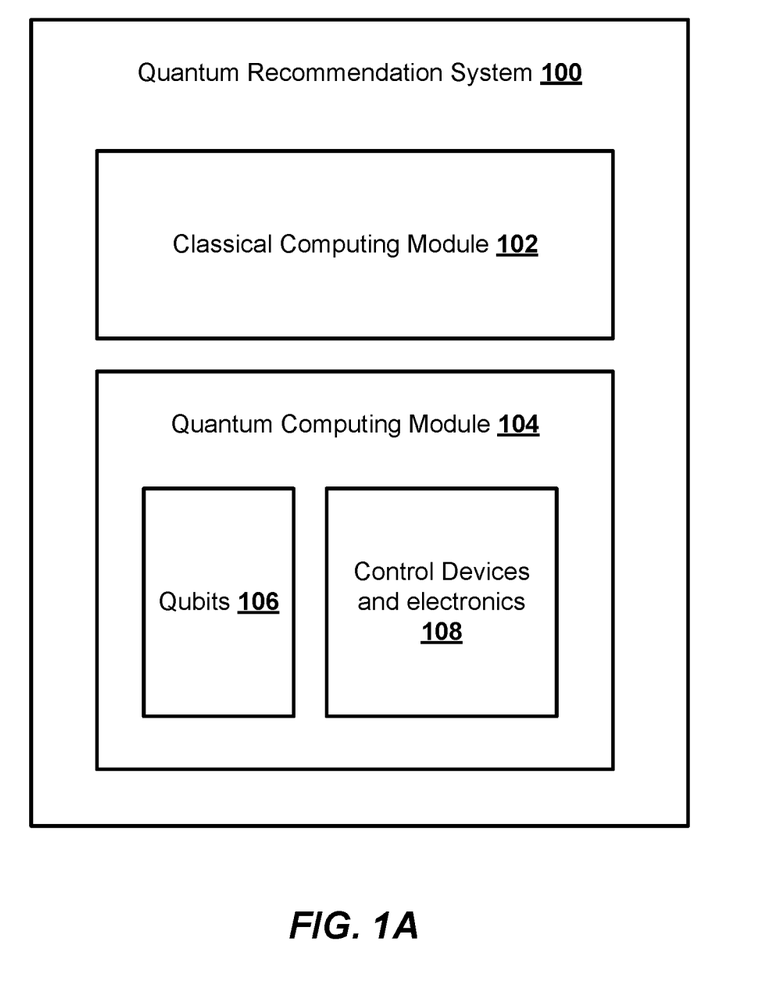
FIG. 1A shows an example system for constructing and performing inference using a quantum decision tree.

FIG. 1A depicts an example quantum recommendation system 100 for constructing and performing inference using a quantum decision tree, e.g., the quantum decision trees described in this specification.

The example quantum recommendation system 100 includes one or more classical computing modules, e.g., classical computing module 102 for performing classical computations. For example, the classical computing module 102 can be configured to perform the classical operations described below with reference to FIGS. 2 and 3.

The example quantum recommendation system 100 also includes one or more quantum computing modules, e.g., quantum computing module 104, for performing quantum computations. For example, the quantum computing module 104 can be configured to perform the quantum operations described below with reference to FIGS. 2 and 3.

The quantum computing module 104 includes qubits 106, and control devices and control electronics 108. The qubits 106 can be used to perform algorithmic operations or quantum computations. The specific realizations of the qubits 106 and their interactions can depend on a variety of factors including the type of quantum computations that the quantum computing module 104 is performing. For example, the qubits 106 can include qubits that are realized via atomic, molecular or solid-state quantum systems. In other examples the qubits 106 can include, but are not limited to, superconducting qubits or semi-conducting qubits. In some cases it may be convenient to include one or more resonators attached to one or more superconducting qubits. In other cases ion traps, photonic devices or superconducting cavities (with which states can be prepared without requiring qubits) can be used. Further examples of realizations of multi-level quantum subsystems include fluxmon qubits, silicon quantum dots or phosphorus impurity qubits.

In some implementations the qubits 106 can be arranged as a register of qubits on which a quantum circuit can operate. Quantum circuits comprising different quantum logic operations, e.g., single qubit gates and multi-qubit gates, can be constructed and implemented using the control devices and control electronics 108. For example, the example quantum circuit 400 of FIG. 4 can be constructed and implemented using the control devices and control electronics 108.

The type of control devices and control electronics 108 included in the quantum computing module 104 depend on the type of qubits included in the quantum computing device. For example, in some cases the control devices and control electronics 108 can include devices that control the frequencies of the qubits 106, e.g., an excitation pulse generator and control lines that couple the qubits to the excitation pulse generator. The control devices can then cause the frequency of each qubit to be adjusted towards or away from a quantum gate frequency of an excitation pulse on a corresponding control driveline.

The control devices and control electronics 108 can further include measurement devices, e.g., readout resonators. Measurement results obtained via measurement devices can be provided to one or more classical processors for processing and analyzing, e.g., classical processors included in the quantum computing module 104 or classical processors that are in data communication with the quantum computing module 104, e.g., classical computing module 102.

Figure 1B:
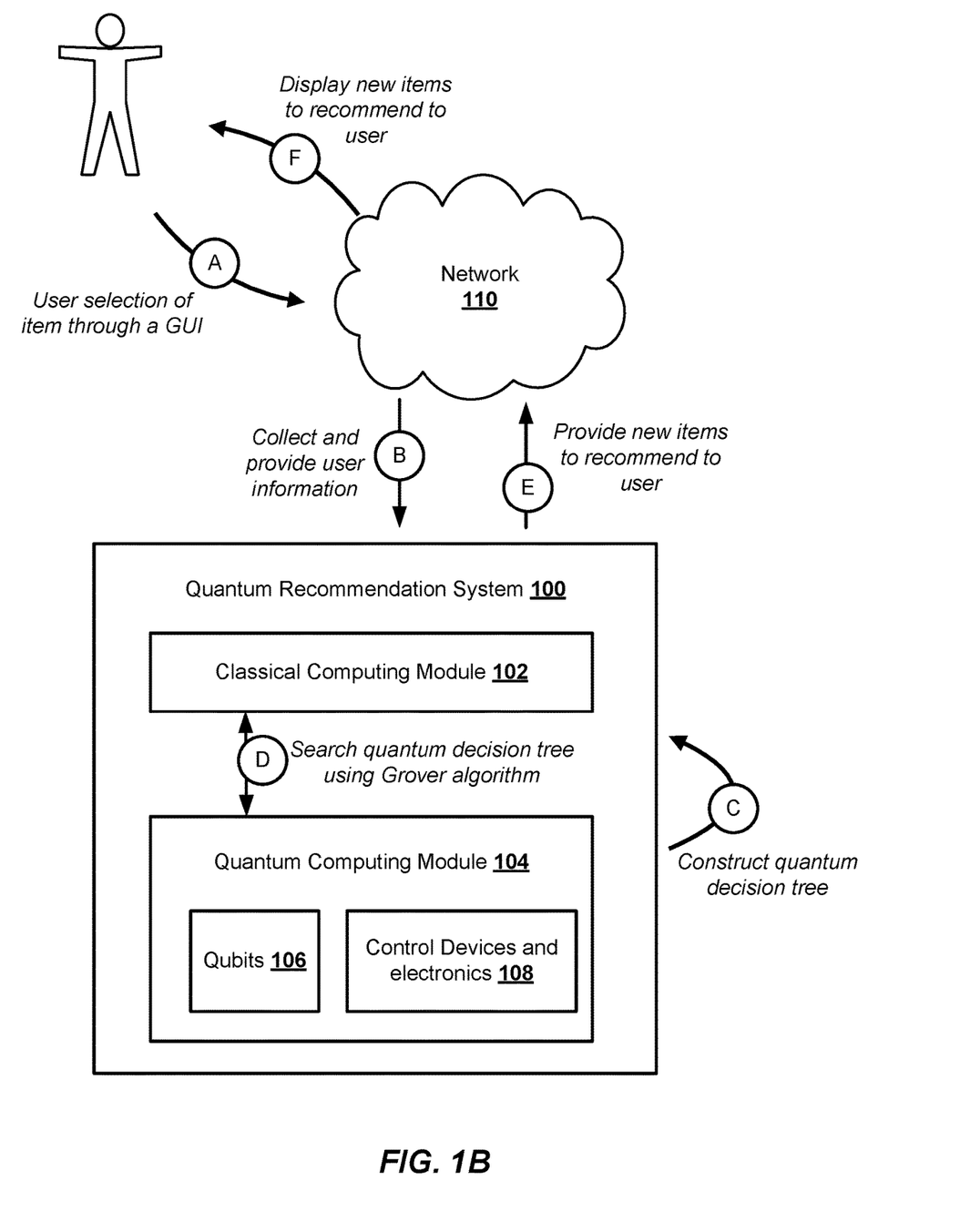
FIG. 1B depicts an example system for constructing and performing inference using a quantum decision tree in operation.

FIG. 1B depicts the example system 100 for constructing and performing inference using a quantum decision tree during operation. As a non-limiting example, FIG. 1B depicts the example system 100 during an example process for recommending items to a user.

During operation (A), a user selects an item. For example, a user can use a web browser displayed on a mobile device to view content available for purchase. Whilst browsing, a user can select an item in order to obtain additional information about that item. Data representing the user selected item is provided to the quantum recommendation system 100 via the network 110. During operation (B), in response to the user selecting the item, the quantum recommendation system 100 can also receive additional data representing information associated with the user from the user mobile device and via the network 110. Information associated with the user can include personal information such as age, gender, profession, and historical behavior data (such as days or times at which the user has previously made purchases, or other historical purchase data such as items and prices of items previously bought by the user).

During operation (C), the quantum recommendation system 100 constructs a quantum decision tree that predicts a value of a target feature, e.g., a likelihood that the user is interested in a particular item. The construction is based on a set of input features, e.g., input features representing information associated with the user, using example process 200 described below with reference to FIG. 2.

During operation (D), the quantum recommendation system 100 uses the constructed quantum decision tree to identify new items that the user is likely to be interested in purchasing. Since the number of input features representing information associated with the user and the number of possible values that each input feature can take can be large, searching the quantum decision tree to identify new items that the user is likely to be interested in purchasing can be a classically intractable problem. Therefore, the quantum recommendation system 100 searches the constructed quantum decision tree using implementations of Grover's algorithm described below with reference to FIGS. 3 and 4.

During operation (E), the quantum recommendation system 100 provides an output of the search of the constructed quantum decision tree to the user via the network 110. For example, the quantum recommendation system 100 can provide new items corresponding to the output of the search of the constructed quantum decision tree to the web browser and cause a web browser to display new items indicated as being of interest to the user.

Programming the Hardware: Constructing a Quantum Decision Tree

Figure 2:
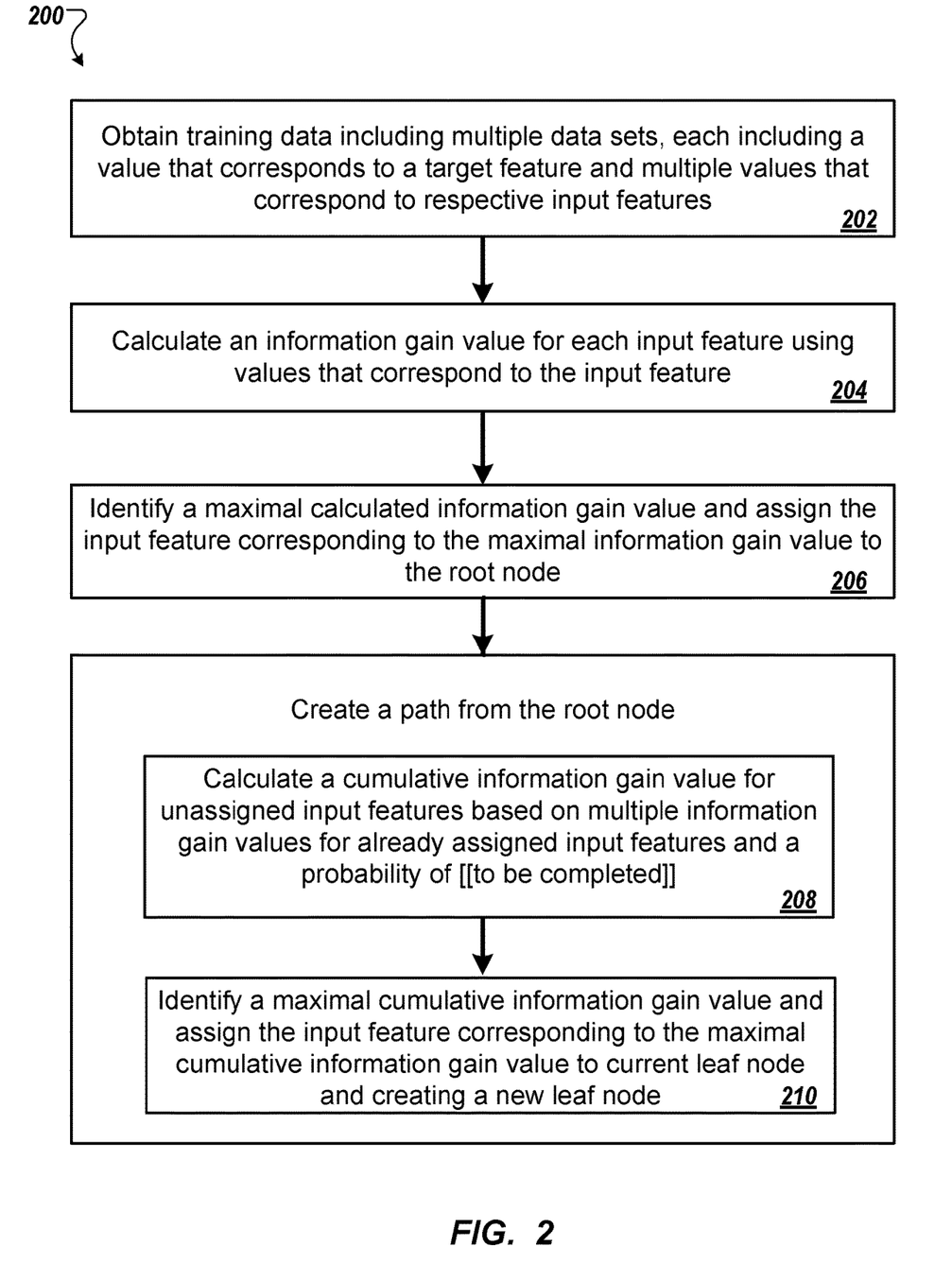
FIG. 2 is a flow diagram of an example process for constructing a quantum decision tree that predicts a value of a target feature based on a set of multiple input features.

FIG. 2 is a flowchart of an example process 200 for constructing a quantum decision tree that predicts a value of a target feature based on a set of input features. For example, the quantum decision tree can be constructed to perform a supervised machine learning task such as a classification task (e.g., predicting a categorical value of a target feature) or regression task (e.g., predicting a numerical value of a target feature). For convenience, the process 200 will be described as being performed by a system of one or more classical and/or quantum computing devices located in one or more locations. For example, example system 100 of FIG. 1, appropriately programmed in accordance with this specification, can perform the process 200.

The system obtains training data (step 202). The training data includes multiple data sets where each data set {x, y} includes a value y that corresponds to the target feature and multiple values $x=x_0, \ldots, x_{i-1}$ that each correspond to a respective input feature of a set of input features.

The system assigns an input feature from the set of input features to a root node of the quantum decision tree. This includes calculating an information gain value for each input feature in the set of input features using values from the training data that correspond to the respective input feature (step 204). That is, the system calculates an information gain value $GI_i$ for every $x_i$ in the input data $\{x_i, y\}$. The information gain value can be calculated using the expression $$GI_i = H(T_j) - H(T_j|x_i) \quad (1)$$

where H ($T_j$) represents the Shannon entropy of the j-th training data set {x, y} and H ($T_j$|i) represents the conditional entropy of the j-th training data set {x, y} given the value of the feature $x_i$.

Since there are n input features and n possible values $x=x_0, \ldots, x_{n-1}$ in each of the multiple data sets, this includes calculating n information gain values. The system then identifies a maximal information gain value from the calculated information gain values and assigns the input feature corresponding to the maximal information gain value to the root node of the quantum decision tree (step 206).

The system assigns remaining input features of the set of multiple input features, i.e., input features that were not assigned to the root node of the quantum decision tree, to additional nodes of the quantum decision tree. This includes creating node paths in the quantum decision tree from the root node to a leaf node and assigning input features to nodes on the path ("path nodes").

Creating a path from the root node includes iteratively: calculating a cumulative information gain value for each unassigned input feature, identifying, from the calculated cumulative information gain values, a maximal cumulative information gain value for the unassigned input features, assigning the unassigned input feature corresponding to the maximal cumulative information gain value to a current leaf node in the path, and creating a new leaf node for the path.

The calculated cumulative information gain value for each unassigned input feature is based on i) multiple information gain values for respective input features that have been assigned to previous nodes on the path, and ii) probabilities that the unassigned input feature is assigned to the current leaf node given the assigned input features to previous nodes on the path (step 208).

In some implementations the cumulative information gain value for an unassigned input feature k can be calculated using the expression $$S_{i,k} = \frac{\sum_{j=0}^{i}(1-GI_j)P_{j,k}}{\sum_{j=0}^{i}(1-GI_j)} \quad (2)$$

where i represents the path node for the iteration, j is an index representing previous nodes on the path, $GI_j$ represents the information gain value (as given by Equation (1) above) calculated using input feature values that correspond to the input feature assigned to node j and $P_{j,k}$ represents a probability that the unassigned input feature k is assigned to the current leaf node given the assignment of input feature j. The cumulative information gain value represents an accumulated probability of nodes prior to k.

For example, for a first path node, i.e., a child node of the root node, the system calculates n−1 cumulative information gain values according to $$S_{1,k} = \frac{\sum_{j=0}^{1}(1-GI_j)P_{j,k}}{\sum_{j=0}^{1}(1-GI_j)} = \frac{(1-GI_0)P_{0,k} + (1-GI_1)P_{1,k}}{(1-GI_0)+(1-GI_1)} \quad (3)$$

for each unassigned input feature k in the set of n multiple input features (n−1 cumulative information gain values because one input feature of the n input features has already been assigned to the root node). The system then identifies, from the n−1 cumulative information gain values, a maximal cumulative information gain value and assigns the input feature corresponding to the maximal cumulative information gain value to the first path node. This produces a set of n−2 unassigned input features.

For a subsequent connected node (second path node), i.e., a child node of the first path node, the system calculates n−2 cumulative information gain values according to $$S_{2,k} = \frac{\sum_{j=0}^{1}(1-GI_j)P_{j,k}}{\sum_{j=0}^{1}(1-GI_j)} = \frac{(1-GI_0)P_{0,k} + (1-GI_1)P_{1,k} + (1-GI_2)P_{2,k}}{(1-GI_0) + (1-GI_1) + (1-GI_2)} \quad (4)$$

for each unassigned input feature k in the set of n multiple input features (n−2 cumulative information gain values because two input features of the n input features have already been assigned to the root node and to the first path node). The system then identifies, from the n−2 cumulative information gain values, a maximal cumulative information gain value and assigns the input feature corresponding to the maximal cumulative information gain value to the second path node. This produces a set of n−3 unassigned input features.

This procedure is repeated until the penultimate node in the path where the system calculates 2 cumulative information gain values for both remaining unassigned input features, identifies a maximal cumulative information gain value and assigns the maximal input feature corresponding to the maximal cumulative information gain value to the penultimate node in the path and assigns the one remaining input feature to the last node in the path (the leaf node).

The system can store the cumulative information gain values $S_{i,k}$ calculated in step 208 and identified as maximal in step 210, together with an identification of a corresponding path node i and input feature k, in lists.

In some implementations the system may further perform Monte Carlo simulations to each calculated cumulative information gain value to generate respective modified cumulative information gain values. For example, for each $0<S_{i,k}<1$ with $S_{i,k}$ given by Equation (2) above, the system may perform a Monte Carlo simulation to generate a new estimated cumulative information gain value $\hat{S}_{i,k}$. In some implementations, e.g., when the machine learning task is a binary classification task, the system may perform a Monte Carlo simulation that samples from a Binomial distribution, e.g., a Binomial (n, $S_{i,k}$) distribution. In other implementations, e.g., when the machine learning task is a multi-class classification task, the system may perform a Monte Carlo simulation that samples from a multinomial distribution, e.g., a multinomial (n, $p_i$).

The new estimated cumulative information gain value $\hat{S}_{i,k}$ can be determined through randomization using a binomial distribution of size N and probability/likelihood $S_{i,k}$ with M steps and performing an average. For example, after defining the size of the Monte Carlo simulation and calculating $S_{i,k}$, the change in the amplitude of the states of target 1 and target 0 with the application of Hadamard port superposition can be performed in 1024 shots, the state 1 and state 0 are then observed and the rate that state 1 was observed can be calculated by dividing by 1024, and stored for each realization of the Monte Carlo simulation. In the end the average of these rates is calculated which is the estimator of $S_{i,k}$.

In these implementations, the system may perform step 210 described above using the modified cumulative information gain values. That is, the system can assign an input feature to a path node by identifying a maximal modified cumulative information gain value from the modified cumulative information gain values for the iteration. When storing the cumulative information gain values calculated in step 208 and identified as maximal in step 210 in lists, the system can store corresponding modified cumulative information gain values.

The system may perform Monte Carlo simulations using classical or quantum computing techniques. For example, in some implementations it may be beneficial to use a quantum computer to perform a Monte Carlo simulation, e.g., to generate true random numbers.

Performing Monte Carlo simulations on the calculated cumulative information gain values can avoid overfitting during the construction of the quantum decision tree, and may be used instead of pruning algorithms. However, without applying pruning algorithms, constructing a decision tree according to the example process 200 (with or without including Monte Carlo simulations) can lead to a combinatorial explosion on the last level of the tree. For example, for training data that represents 35 input features where each feature can take 1 of 5 possible values, the constructed decision tree includes 355 combinations on the last level of the tree. Searching such a tree (in real time) is a very difficult task for classical algorithms. To solve this problem, the presently described method and system utilizes Grover's algorithm at run time to perform the search step, as described in more detail below with reference to FIG. 3.

Programming the Hardware: Search Using a Quantum Decision Tree

Figure 3:
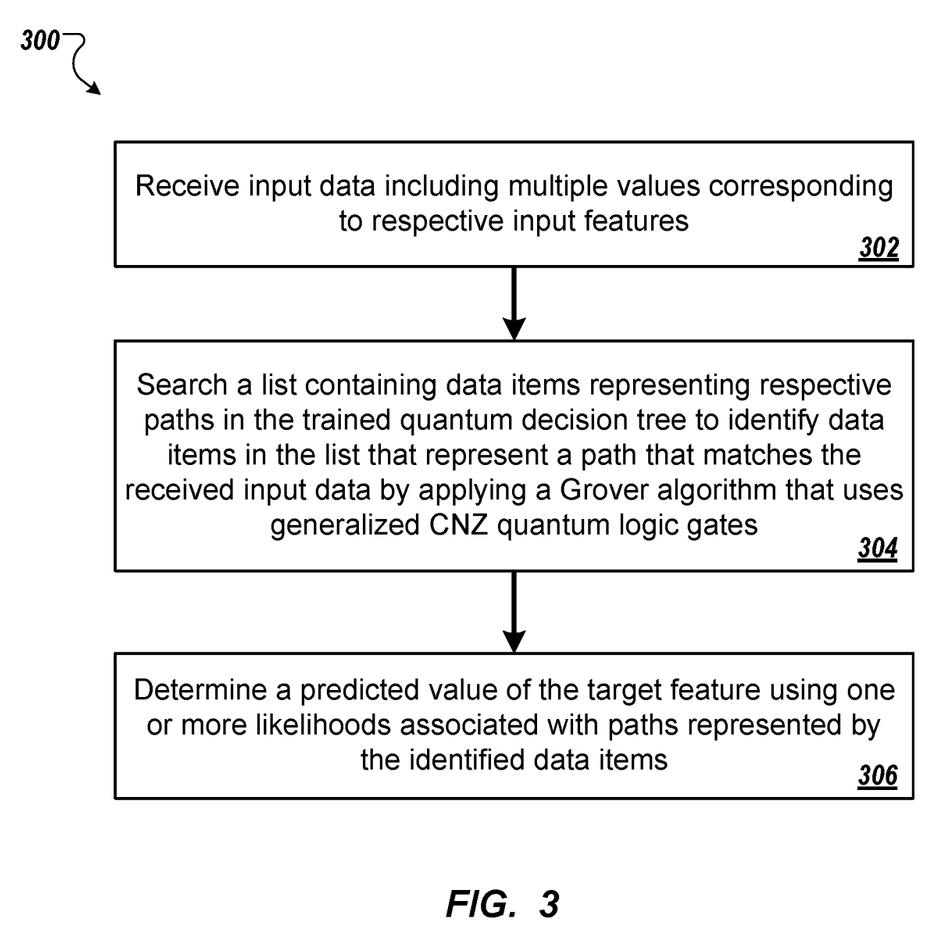
FIG. 3 is a flow diagram of an example process for performing a machine learning task using a quantum decision tree trained to predict a value of a target feature based on values of a set of multiple input features.

FIG. 3 is a flowchart of an example process 300 for performing a machine learning task using a quantum decision tree trained to predict a value of a target feature based on values of a set of input features, wherein the target feature can take one of multiple possible values. For convenience, the process 300 will be described as being performed by a system of one or more classical and quantum computing devices located in one or more locations. For example, example system 100 of FIG. 1, appropriately programmed in accordance with this specification, can perform the process 300.

The system receives input data including multiple values corresponding to respective input features (step 302). In some implementations the received input data may be complete and include a respective value for each input feature in the set of input features. In other implementations the received input data may be incomplete and include respective values for a subset of the input features.

The system searches a list containing data items representing respective paths in the trained quantum decision tree to identify one or more data items in the list that represent a path that matches the received input data (step 304). Each path in the quantum decision tree is associated with one or more likelihoods that the target feature takes a particular value, where the likelihoods are also stored in the list. The system uses these likelihoods to determine a predicted value of the target feature, as described in more detail below with reference to step 306.

To search the list containing data items representing respective paths in the trained quantum decision tree to identify one or more data items in the list that represent a path that matches the received input data, the system applies a Grover algorithm on a quantum computer using a generalized n-controlled-Pauli-Z (CNZ) quantum logic gate to search the list.

Grover's algorithm is a quantum algorithm that can be applied to search efficiently an unstructured database or an unordered list, e.g., the list containing data items representing respective paths in the trained quantum decision tree, with n entries for a marked entry using only $O(\sqrt{n})$ queries.

Figure 4:
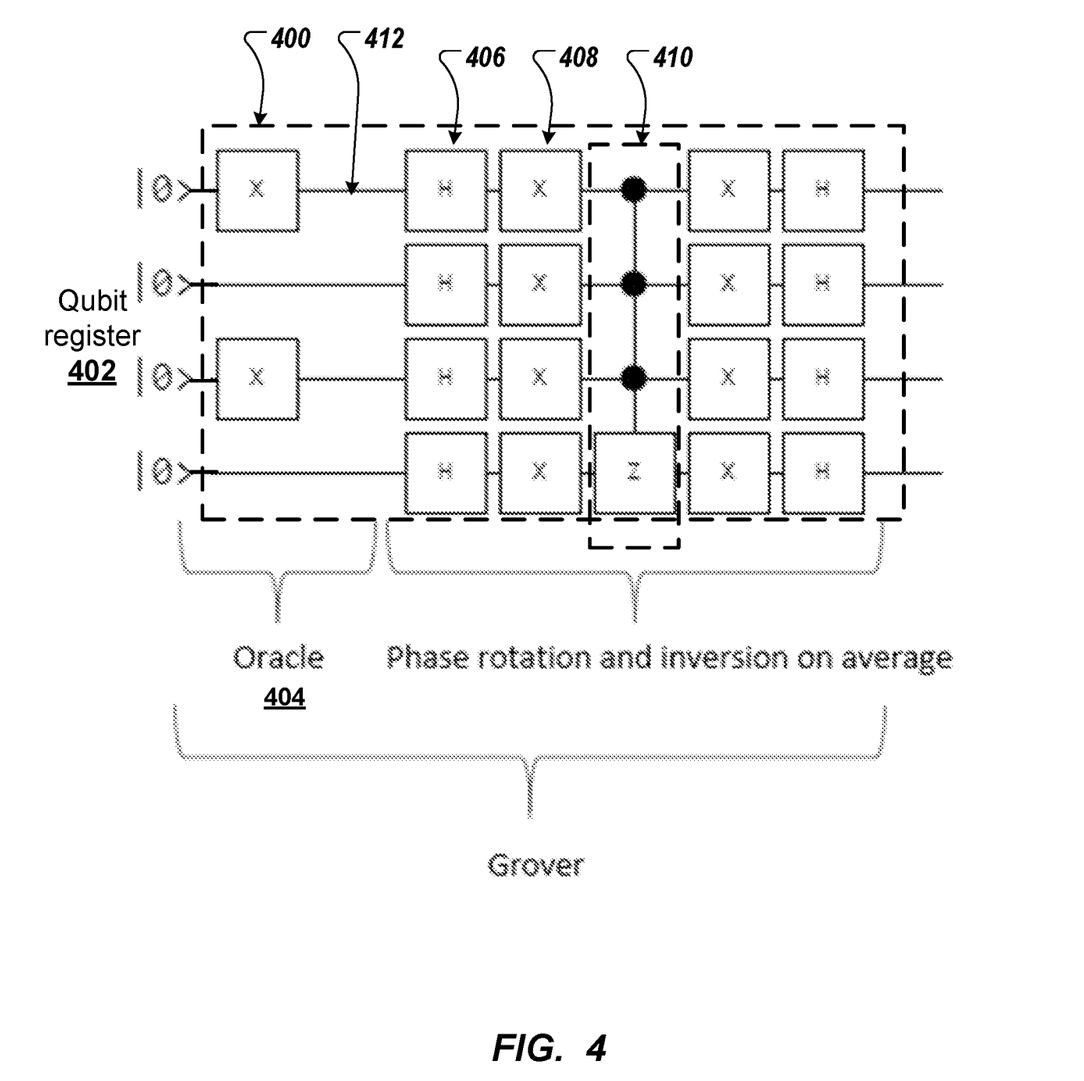
FIG. 4 is an example circuit diagram for implementing Grover's algorithm.

Applying the Grover algorithm on a quantum computer using a generalized CNZ quantum logic gate includes applying a quantum circuit to a register of qubits. One example quantum circuit 400 for implementing the Grover algorithm using a first register with four qubits is illustrated in FIG. 4. As shown in FIG. 4, before the quantum circuit 400 is applied to the quantum register of qubits 402, each of the four qubits in the quantum register is initialized in a zero state |0>. The quantum circuit 400 is then applied to the quantum register of qubits 402.

Applying the quantum circuit 400 to the register of qubits 402 includes performing an oracle step 404 on the multiple qubits. The oracle step includes performing X gates on a subset of the multiple qubits, e.g., according to the Python function def oracle (qc,qr,x):

$x=x[::-1]$ for i,value in enumerate(x):
if value=='1':

$qc.x(qr[i])$ where x represents an input data bit string, qc represents the quantum circuit, and qr represents a quantum register.

Figure 5:
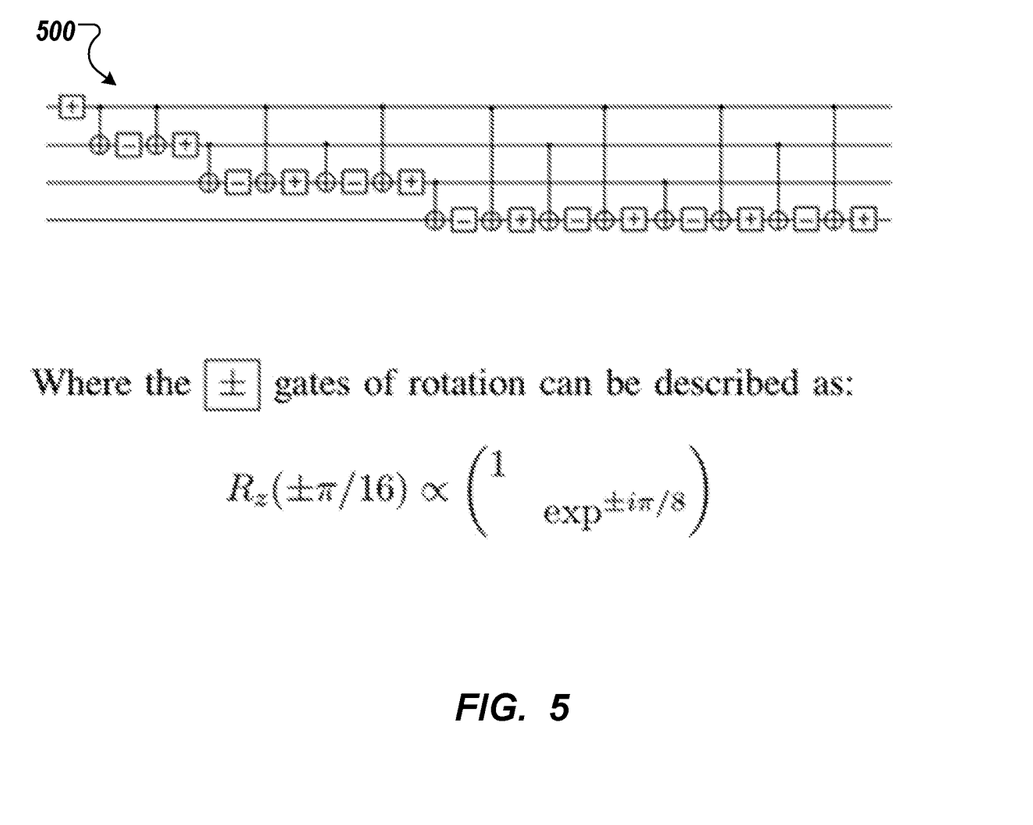
FIG. 5 is an example circuit diagram of a generalized CNZ quantum logic gate.

A Hadamard gate, e.g., Hadamard gate 406, is then applied to each qubit in the quantum register 402. A Pauli-X gate, e.g., Pauli-X gate 408, is then applied to each qubit in the quantum register 402. The generalized CNZ quantum logic gate 410 is then performed, where the generalized CNZ quantum logic gate 410 applies a Pauli-Z gate to a last qubit in the quantum register 402 controlled on other qubits in the quantum register. A Pauli-X gate is then applied to each qubit in the quantum register, and a Hadamard gate is applied to each qubit in the quantum register. Although not shown in FIG. 4, in some implementations the quantum circuit 400 may further include a phase rotation operation with an angle of $\pi/16$ that is applied to a first qubit in the quantum register (top most qubit 412) before the generalized CNZ quantum logic gate 410 is performed or as part of the generalized CNZ quantum logic gate, as shown in FIG. 5.

In some implementations performing the generalized CNZ quantum logic gate includes, for a quantum register that includes two qubits: performing a controlled-X gate on a first qubit, where a second qubit acts as a control for the controlled-X gate; performing a phase rotation with an angle of $-\pi/16$ on the second qubit; performing a controlled-X gate on a first qubit, wherein a second qubit acts as a control for the controlled-X gate; and performing a phase rotation with an angle of $\pi/16$ on the second qubit.

For a quantum register that includes more than two qubits, performing the generalized CNZ quantum logic gate includes repeatedly performing, a number of times equal to twice the number of qubits i minus 1: performing a controlled-X gate on an i-th qubit, wherein an i–1-th qubit acts as a control for the controlled-X gate; performing a phase rotation with an angle of $-\pi/16$ on the i-th qubit; performing a controlled-X gate on the i-th qubit, wherein the $1^{st}$ qubit acts as a control for the controlled-X gate; and performing a phase rotation with an angle of $\pi/16$ on the i-th qubit. FIG. 5 shows an example circuit diagram 500 for performing a generalized CNZ quantum logic gate on a 4 qubit register.

Returning to FIG. 3, the system determines a predicted value of the target feature using one or more likelihoods associated with paths represented by the identified one or more data items (step 306).

For example, in cases where the input data received at step 302 is complete and the machine learning task that the quantum decision tree is trained to perform is a multi-class classification task, the system may determine a predicted value of the target feature by selecting a predicted value of the target feature that corresponds to a largest of the likelihoods associated with the path that matches the input data, e.g., set the predicted value of the target feature as $g(x_i)$ =argmax($S_{i,k,c}$), where c labels the multiple classes and $S_{i,k,c}$ represents the (modified or unmodified) cumulative information gain calculated for the leaf node in the path As another example, in cases where the input data received at step 302 is complete and the machine learning task that the quantum decision tree is trained to perform is a regression task, the system may determine a predicted value of the target feature by selecting a predicted value of the target feature as equal to the likelihood, e.g., set the predicted value of the target feature as $g(x_i)=S_{i,k}$ where $S_{i,k}$ represents the (modified or unmodified) cumulative information gain calculated for the leaf node in the path.

In cases where the input data received at step 302 is incomplete a preprocessing step is performed to generate complete input data.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computing device" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
   training a quantum decision tree, comprising:
     obtaining training data comprising data sets, wherein each data set comprises a value that corresponds to a target feature and multiple values that each correspond to a respective input feature of a set of input features;
     assigning an input feature from the set of input features to a root node of a quantum decision tree, comprising:
       for each input feature in the set of input features:
         calculating an information gain value for the input feature using values that correspond to the input feature; and
         identifying, from the calculated information gain values, a maximal information gain value and assigning the input feature corresponding to the maximal information gain value to the root node;
     creating a path from the root node, wherein creating the path comprises:
       iteratively:
         calculating a cumulative information gain value for unassigned input features based on i) multiple information gain values for respective input features that have been assigned to previous nodes on the path, and ii) probabilities that the unassigned input features are assigned to a current leaf node given the assigned input features to previous nodes on the path;
         performing Monte Carlo simulations to generate respective modified cumulative information gain values; and
         identifying, from the calculated cumulative information gain values, a maximal cumulative information gain value for the unassigned input features and assigning an unassigned input feature corresponding to the maximal cumulative information gain value to the current leaf node in the path creating a new leaf node, comprising identifying, from the modified cumulative information gain values, a maximal modified cumulative information gain value and assigning the input feature corresponding to the maximal modified cumulative information gain value to the current leaf node in the path;
   receiving input data comprising data representing a user selected item and multiple values that each correspond to a respective input feature of the set of input features;
   searching the trained quantum decision tree using a Grover algorithm to identify a path that matches the input data, wherein the path that matches the input data comprises one or more data items; and
   providing the one or more data items as new items to recommend to the user.

2. The method of claim 1, wherein the Monte Carlo simulations sample from a binomial distribution.

3. The method of claim 1, wherein performing the Monte Carlo simulation comprises performing the Monte Carlo simulation using a quantum computer.

4. The method of claim 1, further comprising storing the calculated cumulative information gain values identified as maximal, together with an identification of a corresponding path node i and input feature k in one or more lists.

5. The method of claim 1, wherein calculating a cumulative information gain value for the unassigned input feature based on i) multiple information gain values for respective input features that have been assigned to previous nodes on the path, and ii) probabilities that the unassigned input feature is assigned to the current leaf node given the assigned input features to previous nodes on the path, comprises calculating $$S_{i,k} = \frac{\sum_{j=0}^{i}(1 - GI_j)P_{j,k}}{\sum_{j=0}^{i}(1 - GI_j)}$$

where i represents the current leaf node in the path for the iteration, k represents the unassigned input feature, j is an index representing previous nodes on the path, $GI_j$ represents an information gain value calculated using input feature values that correspond to the input feature assigned to node j, and $P_{j,k}$ represents a probability that the unassigned input feature k is assigned to the current leaf node given the assignment of input feature j.

6. The method of claim 1, wherein the quantum decision tree is constructed to perform a machine learning task, wherein the machine learning task comprises a classification task or a regression task.

7. A computer-implemented method comprising:
receiving input data comprising data representing a user selected item and multiple values corresponding to respective input features;
searching a list containing data items representing respective paths in a trained quantum decision tree, wherein each path in the quantum decision tree is associated with one or more likelihoods that a target feature takes each of the multiple values, to identify one or more data items in the list that represents a path that matches the input data,
wherein searching the list comprises applying a Grover algorithm on a quantum computer using a generalized n-controlled-Pauli-Z (CNZ) quantum logic gate to search the list, wherein implementing the Grover algorithm on a quantum computer using a generalized CNZ quantum logic gate comprises:
initializing each of multiple qubits in a quantum register in a zero state;
after initializing each of the multiple qubits in the quantum register in the zero state, performing an oracle step on a subset of the multiple qubits;
after performing the oracle step on the subset of the multiple qubits, performing a Hadamard gate on each qubit in the quantum register;
after performing the Hadamard gate on each qubit in the quantum register, performing a Pauli-X gate on each qubit in the quantum register;
after performing a Pauli-X gate on each qubit in the quantum register, performing the generalized CNZ quantum logic gate;
after performing the generalized CNZ quantum logic gate, performing a Pauli-X gate on each qubit in the quantum register; and
after performing the Pauli-X gate on each qubit in the quantum register, performing a Hadamard gate on each qubit in the quantum register;
determining a predicted value of the target feature using one or more likelihoods associated with paths represented by the identified one or more data items; and
providing the one or more data items in the list as new items to recommend to the user.

8. The method of claim 7, wherein using the generalized CNZ quantum logic gate comprises, for a quantum register comprising two qubits:
performing a controlled-X gate on a second qubit, wherein a first qubit acts as a control for the controlled-X gate;
performing a phase rotation with an angle of $-\pi/16$ on the second qubit;
performing a controlled-X gate on the second qubit, wherein the first qubit acts as a control for the controlled-X gate; and
performing a phase rotation with an angle of $\pi/16$ on the second qubit.

9. The method of claim 8, wherein using the generalized CNZ quantum logic gate comprises, for a quantum register comprising three or more qubits, repeatedly performing, a number of times equal to twice the number of qubits i minus 1:
performing a controlled-X gate on an i-th qubit, wherein an i-1-th qubit acts as a control for the controlled-X gate;
performing a phase rotation with an angle of $-\pi/16$ on the i-th qubit;
performing a controlled-X gate on the i-th qubit, wherein the i-1-th qubit acts as a control for the controlled-X gate; and
performing a phase rotation with an angle of $\pi/16$ on the i-th qubit.

10. The method of claim 7, further comprising, before performing the generalized CNZ quantum logic gate, performing a phase rotation with an angle of $\pi/16$ on a first qubit in the quantum register.

11. The method of claim 7, wherein the trained quantum decision tree is constructed to perform a machine learning task, the machine learning task comprising a multiclass classification task, and wherein determining a predicted value of the target feature using one or more likelihoods associated with paths represented by the identified one or more data items comprises selecting a predicted value of the target feature that corresponds to a largest likelihood.

12. The method of claim 7, wherein the trained quantum decision tree is constructed to perform a machine learning task, the machine learning task comprising a regression task, and wherein determining a predicted value of the target feature using one or more likelihoods associated with paths represented by the identified one or more data items comprises selecting the predicted value of the target feature as equal to a likelihood associated with the path that matches the input data.

13. The method of claim 7, wherein the input data is incomplete.

14. A system comprising:
a classical processor;
a quantum computing device in data communication with the classical processor;
wherein the classical processor and quantum computing device are configured to perform operations comprising:
training a quantum decision tree, comprising:
obtaining training data comprising data sets, wherein each data set comprises a value that corresponds to a target feature and multiple values that each correspond to a respective input feature of a set of input features;
assigning an input feature from the set of input features to a root node of the quantum decision tree, comprising:
for each input feature in the set of input features:
calculating an information gain value for the input feature using values that correspond to the input feature; and
identifying, from the calculated information gain values, a maximal information gain value and assigning the input feature corresponding to the maximal information gain value to the root node;
creating a path from the root node, wherein creating the path comprises:
iteratively:
calculating a cumulative information gain value for unassigned input features based on i) multiple information gain values for respective input features that have been assigned to previous nodes on the path, and ii) probabilities that the unassigned input features are assigned to a current leaf node given the assigned input features to previous nodes on the path;
performing Monte Carlo simulations to generate respective modified cumulative information gain values; and identifying, from the calculated cumulative information gain values, a maximal cumulative information gain value for the unassigned input features and assigning an unassigned input feature corresponding to the maximal cumulative information gain value to the current leaf node in the path creating a new leaf node, comprising identifying, from the modified cumulative information gain values, a maximal modified cumulative information gain value and assigning the input feature corresponding to the maximal modified cumulative information gain value to the current leaf node in the path;

receiving input data comprising data representing a user selected item and multiple values that each correspond to a respective input feature of the set of input features;

searching the trained quantum decision tree using a Grover algorithm to identify a path that matches the input data, wherein the path that matches the input data comprises one or more data items; and providing the one or more data items as new items to recommend to the user.

15. A system comprising:

a classical processor;

a quantum computing device in data communication with the classical processor;

wherein the classical processor and quantum computing device are configured to perform operations comprising:

receiving input data comprising data representing a user selected item and multiple values corresponding to respective input features;

searching a list containing data items representing respective paths in a trained quantum decision tree, wherein each path in the quantum decision tree is associated with one or more likelihoods that a target feature takes each of the multiple values, to identify one or more data items in the list that represents a path that matches the input data, wherein searching the list comprises applying a Grover algorithm on the quantum computing device using a generalized n-controlled-Pauli-Z (CNZ) quantum logic gate to search the list, wherein implementing the Grover algorithm on a quantum computer using a generalized CNZ quantum logic gate comprises:

initializing each of multiple qubits in a quantum register in a zero state;

after initializing each of the multiple qubits in the quantum register in the zero state, performing an oracle step on a subset of the multiple qubits;

after performing the oracle step on the subset of the multiple qubits, performing a Hadamard gate on each qubit in the quantum register;

after performing the Hadamard gate on each qubit in the quantum register, performing a Pauli-X gate on each qubit in the quantum register;

after performing a Pauli-X gate on each qubit in the quantum register, performing the generalized CNZ quantum logic gate;

after performing the generalized CNZ quantum logic gate, performing a Pauli-X gate on each qubit in the quantum register; and after performing the Pauli-X gate on each qubit in the quantum register, performing a Hadamard gate on each qubit in the quantum register;

determining a predicted value of the target feature using one or more likelihoods associated with paths represented by the identified one or more data items; and providing the one or more data items in the list as new items to recommend to the user.

16. The system of claim 15, wherein using the generalized CNZ quantum logic gate comprises, for a quantum register comprising two qubits:

performing a controlled-X gate on a second qubit, wherein a first qubit acts as a control for the controlled-X gate;

performing a phase rotation with an angle of $-\pi/16$ on the second qubit;

performing a controlled-X gate on the second qubit, wherein the first qubit acts as a control for the controlled-X gate; and performing a phase rotation with an angle of $\pi/16$ on the second qubit.

17. The system of claim 16, wherein using the generalized CNZ quantum logic gate comprises, for a quantum register comprising three or more qubits, repeatedly performing, a number of times equal to twice the number of qubits i minus 1:

performing a controlled-X gate on an i-th qubit, wherein an i–1-th qubit acts as a control for the controlled-X gate;

performing a phase rotation with an angle of $-\pi/16$ on the i-th qubit;

performing a controlled-X gate on the i-th qubit, wherein the i–1-th qubit acts as a control for the controlled-X gate; and performing a phase rotation with an angle of $\pi/16$ on the i-th qubit.

* * * * *